United States Patent
Cho et al.

(10) Patent No.: US 10,167,952 B2
(45) Date of Patent: Jan. 1, 2019

(54) CLUTCH TORQUE CONTROL METHOD FOR DCT VEHICLE

(71) Applicants: Hyundai Motor Company, Seoul (KR); Kia Motors Corp., Seoul (KR)

(72) Inventors: Sung Hyun Cho, Yongin-si (KR); Joung Chul Kim, Suwon-si (KR)

(73) Assignees: Hyundai Motor Company, Seoul (KR); Kia Motors Corp., Seoul (KR)

(*) Notice: Subject to any disclaimer, the term of this patent is extended or adjusted under 35 U.S.C. 154(b) by 163 days.

(21) Appl. No.: 15/354,503

(22) Filed: Nov. 17, 2016

(65) Prior Publication Data

US 2017/0067559 A1 Mar. 9, 2017

Related U.S. Application Data

(63) Continuation-in-part of application No. 14/563,495, filed on Dec. 8, 2014, now abandoned.

(30) Foreign Application Priority Data

Apr. 29, 2014 (KR) .................. 10-2014-0051452

(51) Int. Cl.
*F16H 61/688* (2006.01)
*F16D 48/06* (2006.01)
(Continued)

(52) U.S. Cl.
CPC ......... *F16H 61/688* (2013.01); *F16D 48/062* (2013.01); *F16H 59/20* (2013.01);
(Continued)

(58) Field of Classification Search
CPC .......... Y10T 477/638; Y10T 477/6425; Y10T 477/75; Y10T 477/753; Y10T 477/78;
(Continued)

(56) References Cited

U.S. PATENT DOCUMENTS 5,020,391 A * 6/1991 Aoki ................ F16H 61/061
477/143
8,594,901 B1 11/2013 Yoon et al.
(Continued)

FOREIGN PATENT DOCUMENTS

JP 9-296742 A 11/1997
JP 2008-032185 A 2/2008
(Continued)

OTHER PUBLICATIONS

English translation of JP2013036484; http://translationportal.epo.org; May 9, 2018. (Year: 2018).*

*Primary Examiner* — Roger L Pang
(74) *Attorney, Agent, or Firm* — Morgan, Lewis & Bockius LLP

(57) ABSTRACT

A clutch torque control method for a dual clutch transmission (DCT) vehicle may include a shift initiation determining step of determining whether power-on downshift in which a driver steps on an accelerator pedal to change a current shift stage to a lower shift stage is initiated, and a torque correcting step of correcting basic control torque according to torque-stroke (TS) curve characteristics for controlling a disengagement-side clutch within a real shift range in which a number of rotations of an engine is changed with observer torque calculated by a torque observer when the power-on downshift is initiated, and determining the corrected basic control torque into control torque of the disengagement-side clutch.

9 Claims, 2 Drawing Sheets

(51) Int. Cl.
*F16H 59/20* (2006.01)
*F16H 59/42* (2006.01)
*F16H 59/36* (2006.01)

(52) U.S. Cl.
CPC ....... *F16H 59/42* (2013.01); *F16D 2500/106* (2013.01); *F16D 2500/10412* (2013.01); *F16D 2500/308* (2013.01); *F16D 2500/3042* (2013.01); *F16D 2500/3067* (2013.01); *F16D 2500/30415* (2013.01); *F16D 2500/30421* (2013.01); *F16D 2500/3144* (2013.01); *F16D 2500/50224* (2013.01); *F16D 2500/50284* (2013.01); *F16D 2500/7044* (2013.01); *F16D 2500/70252* (2013.01); *F16D 2500/70264* (2013.01); *F16D 2500/70605* (2013.01); *F16H 2059/366* (2013.01); *Y10T 477/638* (2015.01); *Y10T 477/6425* (2015.01); *Y10T 477/75* (2015.01); *Y10T 477/753* (2015.01); *Y10T 477/78* (2015.01)

(58) Field of Classification Search
CPC ......... F16D 48/062; F16D 2500/70264; F16D 2500/7044; F16D 2500/70252; F16D 2500/3067; F16D 2500/3144; F16D 2500/70605; F16D 2500/30472; F16D 2500/30421; F16D 2500/3042

USPC .............................. 74/330, 331, 335; 701/67
See application file for complete search history.

(56) References Cited

U.S. PATENT DOCUMENTS

| | | | | |
|---|---|---|---|---|
| 9,458,932 | B2* | 10/2016 | Cho | F16H 63/46 |
| 2011/0004380 | A1* | 1/2011 | Kojima | F16D 48/0206 |
| | | | | 701/53 |
| 2012/0216640 | A1* | 8/2012 | Hoffmeister | B60W 10/02 |
| | | | | 74/335 |
| 2013/0073154 | A1* | 3/2013 | Tanaka | F16D 48/06 |
| | | | | 701/54 |
| 2015/0127242 | A1* | 5/2015 | Iizuka | F16H 61/02 |
| | | | | 701/110 |
| 2015/0260238 | A1* | 9/2015 | Moorman | F16D 25/14 |
| | | | | 701/67 |

FOREIGN PATENT DOCUMENTS

| | | |
|---|---|---|
| JP | 2008-069851 A | 3/2008 |
| JP | 2013-036484 A | 2/2013 |
| KR | 10-2010-0048567 A | 5/2010 |
| KR | 10-1355620 B1 | 1/2014 |
| WO | WO 2010/134183 A1 | 11/2010 |

* cited by examiner

CLUTCH TORQUE CONTROL METHOD FOR DCT VEHICLE

CROSS REFERENCE TO RELATED APPLICATION(S)

The present application is a Continuation in Part of U.S. patent application Ser. No. 14/563,495, filed Dec. 18, 2014, which claims priority to Korean Patent Application No. 10-2014-0051452, filed Apr. 29, 2014, the entire contents of which are incorporated herein for all purposes by these references.

BACKGROUND OF THE INVENTION

Field of the Invention

The present invention relates, in general, to a clutch torque control method for a dual clutch transmission (DCT) vehicle and, more particularly, to a technique for controlling clutch torque of a dry clutch constituting a DCT.

Description of Related Art

Dual clutch transmissions (DCTs) are designed to receive power from a power source such as an engine through two clutches, to selectively transmit the power to two input shafts that are set to allow a series of shift stages to realize respective odd and even number stages, and to cause the shift stages to be sequentially changed by torque handover by which one of the two clutches is engaged and the other is disengaged. Thereby, the shift stage can be changed to a higher or lower shift stage without reducing torque.

Among DCTs, some use the two clutches connected to the two input shafts as wet clutches, and some use the two clutches as dry clutches. Unlike the wet clutch, the dry clutch is subjected to a continuous change in torque-stroke (TS) curve characteristics that refer to characteristics of transmission torque of the dry clutch relative to a stroke of an actuator driving the dry clutch. As such, when the TS curve characteristics should be learned as frequently as possible and be accurately secured, and when the actuator should be controlled according to the accurately secured TS curve characteristics, the dry clutch can realize a stable operation when the shift stage is changed.

However, since in reality it is impossible to learn the TS curve characteristics of the dry clutch each time, when the change of the shift stage is controlled using the latest TS curve characteristics in an abruptly changed state or in an incompletely learned state, it results in controlling the actuator based on incorrect information. As such, a shift shock or an engine flare phenomenon in which the number of rotations of the engine is suddenly raised may occur.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a clutch torque control method for a dual clutch transmission (DCT) vehicle which is adapted to properly correct torque-stroke (TS) curve characteristics used when a shift stage is changed while a dry clutch is controlled according to stored TS curve characteristics, thereby improving the quality of downshift/upshift and preventing a situation such as engine flare due to more precise control of the dry clutch.

According to various aspects of the present invention, a clutch torque control method for a DCT vehicle may include a shift initiation determining step of determining whether power-on downshift in which a driver steps on an accelerator pedal to change a current shift stage to a lower shift stage is initiated, and a torque correcting step of correcting basic control torque according to torque-stroke (TS) curve characteristics for controlling a disengagement-side clutch within a real shift range in which a number of rotations of an engine is changed with observer torque calculated by a torque observer when the power-on downshift is initiated, and determining the corrected basic control torque into control torque of the disengagement-side clutch.

The clutch torque control method may further include a real shift starting determining step of determining whether a difference between the number of rotations of the engine and the number of rotations of a disengagement-side input shaft exceeds a predetermined first reference rotation number in order to determine whether to be within the real shift range prior to the torque correcting step, and starting the torque correcting step only when the difference exceeds the first reference rotation number.

The clutch torque control method may further include, between the real shift entrance determining step and the torque correcting step, a stability securing step of stabilizing the shift control is performed by starting the torque correcting step only when a difference between the basic control torque and the observer torque is less than a value of reference torque.

The torque correcting step may include determining the control torque of the disengagement-side clutch by adding or subtracting a correction value, which is determined by a function relation in which a value obtained by subtracting the observer torque calculated by the torque observer from the basic control torque obtained by the previously learned TS curve characteristics is used as an independent variable, to or from the basic control torque.

The shift control method may further include a real shift termination determining step of repetitively determining whether the difference between the number of rotations of the engine and a number of rotations of an engagement-side input shaft is less than a predetermined second reference rotation number in order to check whether the real shift is completed, while performing the torque correcting step within the real shift range only, and terminating the torque correcting step when the difference is less than the second reference rotation number.

According to the clutch torque control method, torque-stroke (TS) curve characteristics used when a shift stage is changed under the control of a dry clutch according to stored TS curve characteristics are properly corrected, thereby improving the quality of downshift/upshift and preventing a situation such as engine flare due to more precise control of the dry clutch.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
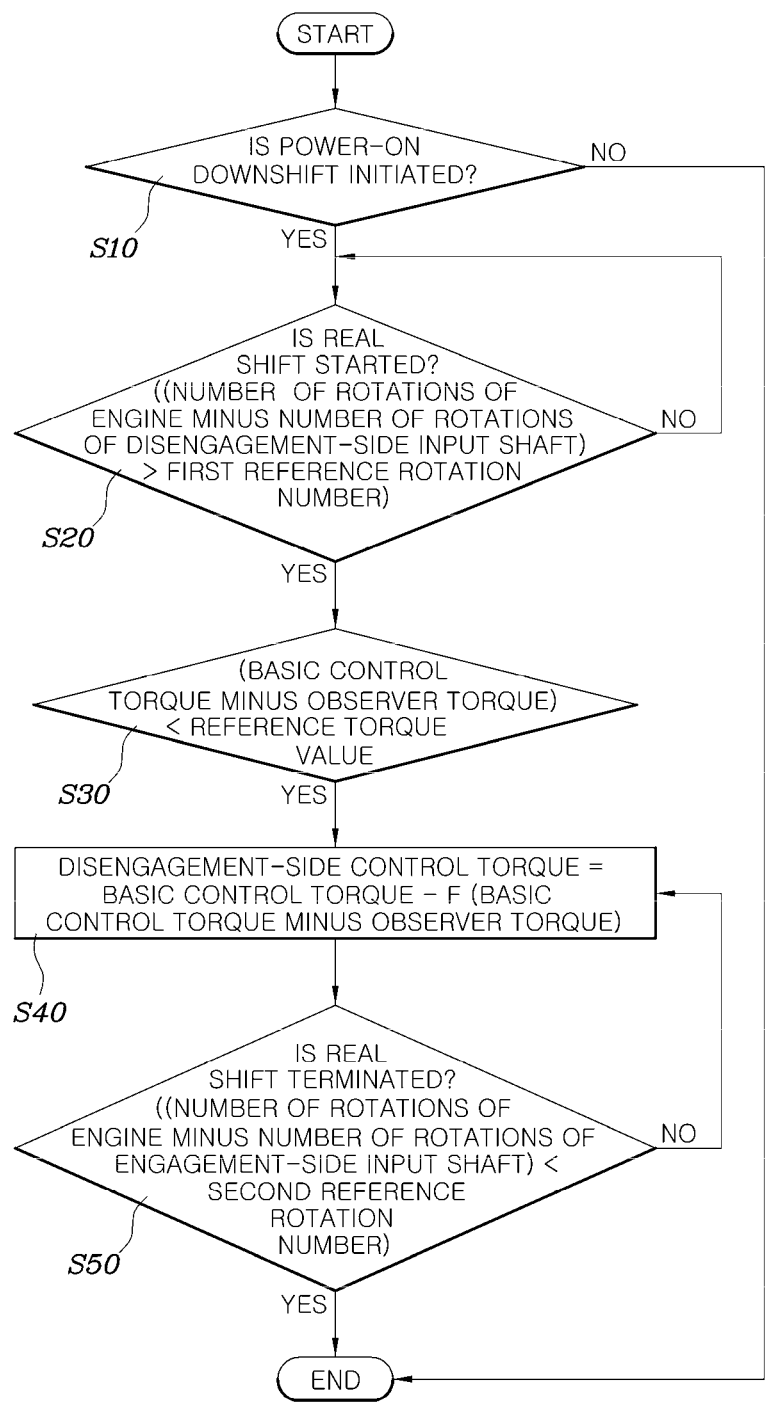
FIG. 1 is a flow chart illustrating an exemplary clutch torque control method for a DCT vehicle according to the present invention.
Figure 2:
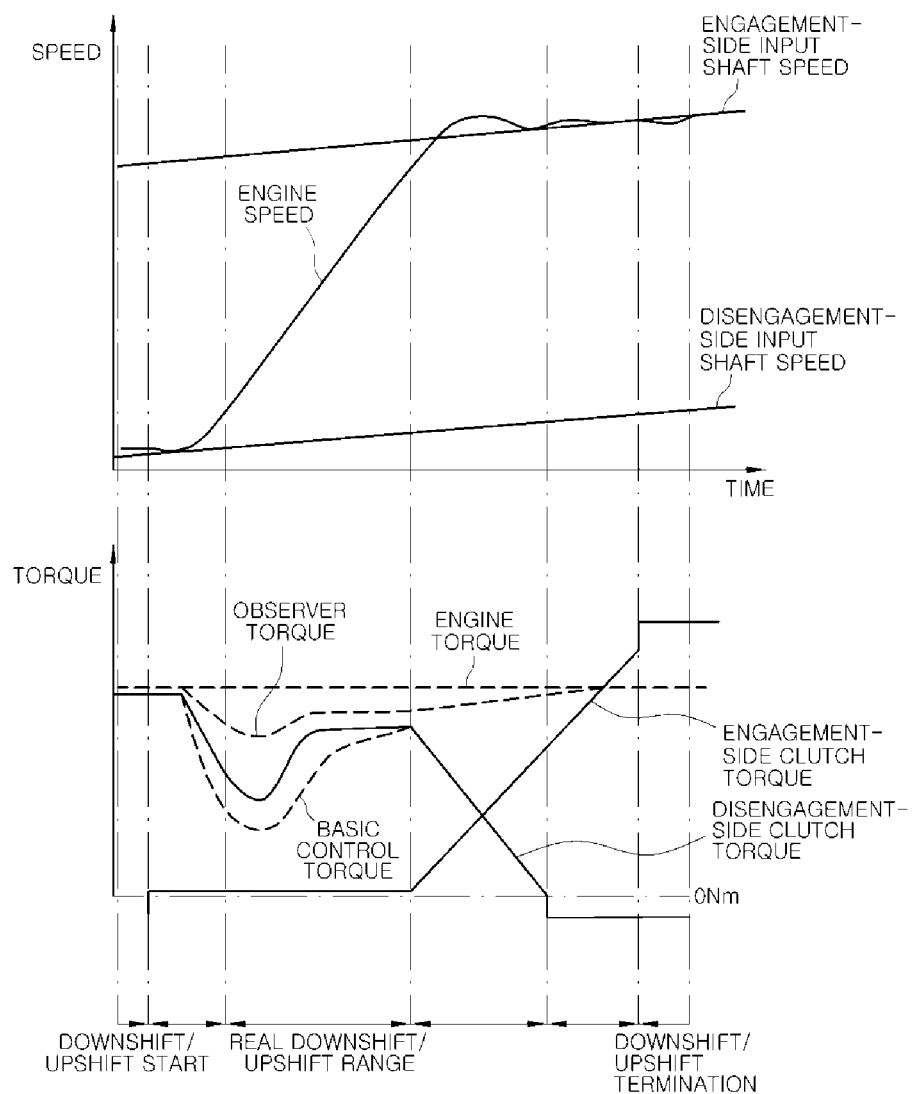
FIG. 2 is a graph representing clutch torque and the number of rotations of an engine at the time of power-on downshift with lapse of time according to the present invention.

Referring to FIG. 1 and FIG. 2, a clutch torque control method for a dual clutch transmission (DCT) vehicle according to various embodiments of the present invention includes a shift initiation determining step S10 of determining whether power-on downshift in which a driver steps on an accelerator pedal to change a current shift stage to a lower shift stage is initiated, and a torque correcting step S40 of correcting basic control torque according to torque-stroke (TS) curve characteristics for controlling a disengagement-side clutch within a real shift range in which the number of rotations of an engine is changed with observer torque calculated by a torque observer when the power-on downshift is initiated, and calculating the corrected basic control torque into control torque of the disengagement-side clutch.

That is, the present invention is adapted to change a shift stage using the disengagement-side clutch control torque corrected by the observer torque at the time of the power-on downshift due to the accelerator pedal operation of the driver. Thereby, an effect of partly correcting, in real time, an error in the TS curve characteristics stored by previous learning is obtained to improve a quality of downshift/upshift and prevent an engine flare phenomenon through more accurate control of the dry clutch.

For reference, the observer torque calculated by the torque observer is obtained by a method described in prior art.

Meanwhile, in various embodiments of the present invention, there is performed a real shift starting determining step S20 of determining whether a difference between the number of rotations of the engine and the number of rotations of a disengagement-side input shaft exceeds a predetermined first reference rotation number in order to determine whether to be within the real shift range prior to the torque correcting step S40, and starting the torque correcting step S40 only when the difference exceeds the first reference rotation number.

For reference, the real shift range refers to a period for which the number of rotations of the engine is changed according to a change in shift stage and is gradually raised from a state in which it is the same as the number of rotations of the disengagement-side input shaft for the first time to a state in which it is the same as the number of rotations of the engagement-side input shaft. The real shift range is also called an inertia phase. Further, in a torque phase followed by the inertia phase, the change of the shift stage is finished by torque handover by which the engagement-side clutch is engaged and the disengagement-side clutch is disengaged.

The first reference rotation number may be set to, for instance, a range from 50 to 100 rpm, and indicates a level by which it can be estimated that the number of rotations of the engine substantially begins to be raised above the number of rotations of the disengagement-side input shaft.

In various embodiments, after the real shift entrance determining step S20 and before the torque correcting step S40, only when a difference between the basic control torque and the observer torque is less than a value of reference torque, a stability securing step S30 of stabilizing the shift control by starting the torque correcting step S40 is performed.

The basic control torque is a value that becomes the control torque of the disengagement-side clutch if the present invention is not practically applied, but is a value that is corrected by the observer torque and becomes the control torque of the disengagement-side clutch after the present invention is applied. The basic control torque is given to distinguish the two values. The value of the basic control torque and the value of the observer torque ideally have little difference, but a difference exists nonetheless. Here, when the basic control torque is corrected according to the observer torque calculated based on the current number of rotations of the engine and the current engine torque, the control will be performed according to the condition of the dry clutch which is closer to a current condition, which is the fundamental technical spirit of the present invention.

However, when the difference between the basic control torque and the observer torque is more than the value of the reference torque, there is a high possibility that the observer torque is incorrectly calculated due to noise. In this case, the control torque of the disengagement-side clutch, which excessively changes the basic control torque, will be calculated, which leads to a possibility of causing incorrect shift control. The present invention is intended to exclude this case. Therefore, the value of reference torque is dependent on a level by which such a possibility can be estimated, and is preferably set by numerous tests and analyses.

In the torque correcting step S40, the control torque of the disengagement-side clutch is calculated as the formula (1) by adding or subtracting a correction value, which is determined by a function relation in which a value obtained by subtracting the observer torque calculated by the torque observer from the basic control torque obtained by the previously learned TS curve characteristics is used as an independent variable, to or from the basic control torque.

Control torque of the disengagement-side
clutch=Basic control torque−$F$*(Basic control
torque−Observer torque),                           Formula (1)

where the F is a positive real number (Preferably, 0<F<1). For example, when the basic control torque is 5, the observer torque is 8, and F is 0.5. The Control torque of the disengagement-side clutch=5−0.5*(5−8)=5+1.5=6.5 and in case the basic control torque is 5, the observer torque is 3, and F is 0.5. The Control torque of the disengagement-side clutch=5−0.5*(5−3)=5−1=4.

In order to perform the torque correcting step S40 within the real shift range only, it is checked whether the real shift has been completed while performing the torque correcting step S40. To this end, a real shift termination determining step S50 of repetitively determining whether the difference between the number of rotations of the engine and the number of rotations of the engagement-side input shaft is less than a predetermined second reference rotation number, and terminating the torque correcting step S40 when the difference is less than the second reference rotation number.

Thus, the second reference rotation number should be set so that the number of rotations produces no shock, even when the number of rotations of the engine is almost identical to the number of rotations of the engagement-side input shaft and the engine is adapted to be rotated along with the engagement-side input shaft by engaging the engagement-side clutch, and that the engagement-side clutch is adapted to be engaged within a time as fast as possible for the purpose of rapidly changing the shift stage. The second reference rotation number may be determined by numerous tests and analyses.

Referring to FIG. 2, the basic control torque based on the original TS curve characteristics within the real shift range of the power-on downshift is shown by a lower dotted line. Here, when the observer torque calculated by the torque observer is shown by an upper dotted line, the present invention is applied, and a solid line between the two dotted lines indicates the control torque of the engagement-side clutch. When the control is adapted to be performed by the control torque of the engagement-side clutch, the shift control is performed to be closer to real torque characteristics of the dry clutch, so that the quality of downshift/upshift is improved, and engine flare is prevented.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof.

What is claimed is:

1. A clutch torque control method for a dual clutch transmission (DCT) vehicle comprising:
a shift initiation determining step of determining whether power-on downshift in which a driver steps on an accelerator pedal to change a current shift stage to a lower shift stage is initiated; and
a torque correcting step of correcting basic control torque according to torque-stroke (TS) curve characteristics for controlling a disengagement-side clutch within a real shift range in which a number of rotations of an engine is changed with observer torque calculated by a torque observer when the power-on downshift is initiated, and converting the corrected basic control torque into control torque of the disengagement-side clutch.

2. The clutch torque control method according to claim 1, further comprising: a real shift starting determining step of determining whether a difference between the number of rotations of the engine and the number of rotations of a disengagement-side input shaft exceeds a predetermined first reference rotation number in order to determine whether to be within the real shift range prior to the torque correcting step, and starting the torque correcting step only when the difference exceeds the first reference rotation number.

3. The clutch torque control method according to claim 2, further comprising: between the real shift entrance determining step and the torque correcting step, a stability securing step of stabilizing the shift control is performed by starting the torque correcting step only when a difference between the basic control torque and the observer torque is less than a value of reference torque.

4. The clutch torque control method according to claim 1, wherein the torque correcting step includes determining the control torque of the disengagement-side clutch by adding or subtracting a correction value, which is determined by a function relation in which a value obtained by subtracting the observer torque calculated by the torque observer from the basic control torque obtained by a previously learned TS curve characteristics is used as an independent variable, to or from the basic control torque.

5. The shift control method according to claim 1, further comprising: a real shift termination determining step of repetitively determining whether the difference between the number of rotations of the engine and a number of rotations of an engagement-side input shaft is less than a predetermined second reference rotation number in order to check whether the real shift is completed, while performing the torque correcting step within the real shift range only, and terminating the torque correcting step when the difference is less than the second reference rotation number.

6. The clutch torque control method according to claim 1, wherein the torque correcting step includes determining the control torque of the disengagement-side clutch by adding or subtracting a correction value, which is determined by a function relation in which a value obtained by subtracting the observer torque calculated by the torque observer from the basic control torque obtained by a previously learned TS curve characteristics is used as an independent variable, to or from the basic control torque, wherein the control torque of the disengagement-side clutch is described as a formula of:

the control torque of the disengagement-side
clutch=the basic control torque−$F$*(the basic
control torque−the observer torque), where the F is a positive real number.

7. The clutch torque control method according to claim 6, wherein the F is greater than 0 and less than 1.

8. The clutch torque control method according to claim 1, wherein the torque correcting step includes determining the control torque of the disengagement-side clutch,
wherein the control torque of the disengagement-side clutch is described as a formula of:

the control torque of the disengagement-side
clutch=the basic control torque−$F$×(the basic
control torque−the observer torque), where the F is a positive real number, and
wherein the basic control torque is obtained by a previously learned TS curve characteristics.

9. The clutch torque control method according to claim 8, wherein the F is greater than 0 and less than 1.

* * * * *